United States Patent
John et al.

(10) Patent No.: US 8,846,208 B2
(45) Date of Patent: Sep. 30, 2014

(54) POROUS MATERIALS, ARTICLES INCLUDING SUCH POROUS MATERIALS, AND METHODS OF MAKING SUCH POROUS MATERIALS

(75) Inventors: Hendrik John, Celle (DE); Sven Hartwig, Hambuhren (DE); Claus-Peter Klages, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 190 days.

(21) Appl. No.: 13/194,598

(22) Filed: Jul. 29, 2011

(65) Prior Publication Data

US 2013/0029170 A1    Jan. 31, 2013

(51) Int. Cl.
| | |
|---|---|
| *B32B 5/14* | (2006.01) |
| *C25D 5/00* | (2006.01) |
| *C25D 5/18* | (2006.01) |
| *B32B 5/18* | (2006.01) |
| *B32B 3/10* | (2006.01) |
| *C25D 3/12* | (2006.01) |
| *C25D 15/00* | (2006.01) |

(52) U.S. Cl.
CPC ... *B32B 3/10* (2013.01); *C25D 5/18* (2013.01); *C25D 3/12* (2013.01); *C25D 15/00* (2013.01); *B32B 5/18* (2013.01)
USPC .......... 428/596; 428/613; 428/304.4; 205/75; 205/112

(58) Field of Classification Search
CPC ........................................ B32B 5/14
USPC ........ 428/596, 613, 304.4; 205/75, 112; 96/4, 96/11
See application file for complete search history.

(56) References Cited

U.S. PATENT DOCUMENTS

| | | | |
|---|---|---|---|
| 3,890,209 A | 6/1975 | Shigeta et al. | |
| 5,041,306 A * | 8/1991 | Warren | 427/126.1 |
| 6,503,382 B1 * | 1/2003 | Bartlett et al. | 205/67 |
| 6,904,658 B2 | 6/2005 | Hines | |
| 2004/0154925 A1 * | 8/2004 | Podlaha et al. | 205/104 |
| 2010/0068623 A1 * | 3/2010 | Braun et al. | 429/219 |

FOREIGN PATENT DOCUMENTS

JP            04263095           9/1992

OTHER PUBLICATIONS

International Search Report for PCT application No. PCT/US2012/047208, mailed Jan. 25, 2013, 3 pages.

* cited by examiner

*Primary Examiner* — Mark Ruthkosky
*Assistant Examiner* — Julia L Rummel
(74) *Attorney, Agent, or Firm* — TraskBritt (57) ABSTRACT

Articles of manufacture comprise a body. A porous material is plated on the body, the porous material comprising nickel having a plurality of pores disposed in a generally ordered array extending into the nickel. Methods of forming a porous material on a body comprise disposing an anode and a cathode in an electrolyte comprising nickel ions. An electrical signal is pulsed to at least one of the anode and the cathode. A porous material comprising nickel having a plurality of pores generally disposed in an ordered array extending into the nickel is deposited on the cathode.

19 Claims, 4 Drawing Sheets

POROUS MATERIALS, ARTICLES INCLUDING SUCH POROUS MATERIALS, AND METHODS OF MAKING SUCH POROUS MATERIALS

FIELD

Disclosed embodiments relate generally to porous materials, structures including porous materials, and methods of making porous materials. Specifically, disclosed embodiments relate to a material having a plurality of pores in a generally ordered array extending into the material.

BACKGROUND

Many processes involve the deposition of one material on another body of material. For example, coatings are frequently disposed on bodies to alter the surface properties thereof. One method known in the art for depositing material on another body is electroplating, which typically involves the deposition of metal onto another metallic body. Generally, electroplating involves placing an anode and a cathode in an electrolyte bath. The anode, the electrolyte bath, or both the anode and the electrolyte bath may comprise elements of the material to be deposited on the body. The cathode may comprise the body on which material is to be deposited, or the body may be electrically coupled with the cathode. A voltage is applied between the anode and the cathode, which results in the generation of an electric field within the electrolyte and deposition of material on the body.

BRIEF DESCRIPTION OF THE DRAWINGS

While the specification concludes with claims particularly pointing out and distinctly claiming what are regarded as embodiments of the present invention, various features and advantages of disclosed embodiments may be more readily ascertained from the following description when read in conjunction with the accompanying drawings, in which:

DETAILED DESCRIPTION

The illustrations presented herein are not meant to be actual views of any particular material, article, or method, but are merely idealized representations that are employed to describe disclosed embodiments. Thus, the drawings are not necessarily to scale and relative dimensions may have been exaggerated for the sake of clarity. Additionally, elements common between figures may retain the same or similar numerical designation.

Disclosed embodiments relate generally to porous materials, articles including porous materials, and methods of making porous materials. Specifically, disclosed embodiments relate to a material having a plurality of pores extending into the material, which, may be disposed in a generally ordered array in some embodiments.

The terms "earth-boring tool" and "earth-boring drill bit," as used herein, mean and include any type of bit or tool used for removing formation material to form or enlarge a wellbore in a subterranean formation, and include, for example, fixed-cutter bits, rolling cone bits, impregnated bits, core bits, eccentric bits, bicenter bits, hybrid bits as well as reamers, mills, and other drilling bits and tools known in the art.

As used herein, the term "superhard material" means and includes any material having a Knoop hardness value of about 3,000 Kg/mm$^2$ (29,420 MPa) or more. Superhard materials include, for example, diamond and cubic boron nitride. Superhard materials may also be characterized as "superabrasive" materials.

As used herein, the term "nanoscale," means and includes any dimension, such as, for example, a distance between two points or two structures, existing or occurring on a scale of between about 1 nm and 500 nm.

As used herein, the term "nanoparticle" means and includes any particle, such as, for example, a crystal or grain, having an average particle diameter of between about 1 nm and 500 nm.

As used herein, the term "sub-micron sized particles" means and includes any particle, such as, for example, a crystal or grain having an average particle diameter of between about 501 nm and 999 nm.

As used herein, the term "microparticle" means and includes any particle, such as, for example, a crystal or grain, having an average particle diameter of between about 1 μm and 500 μm.

As used herein, the term "tungsten carbide" means any material composition that contains chemical compounds of tungsten and carbon, such as, for example, WC, $W_2C$, and combinations of WC and $W_2C$. Tungsten carbide includes, for example, cast tungsten carbide, sintered tungsten carbide, and macrocrystalline tungsten carbide.

Figure 1:
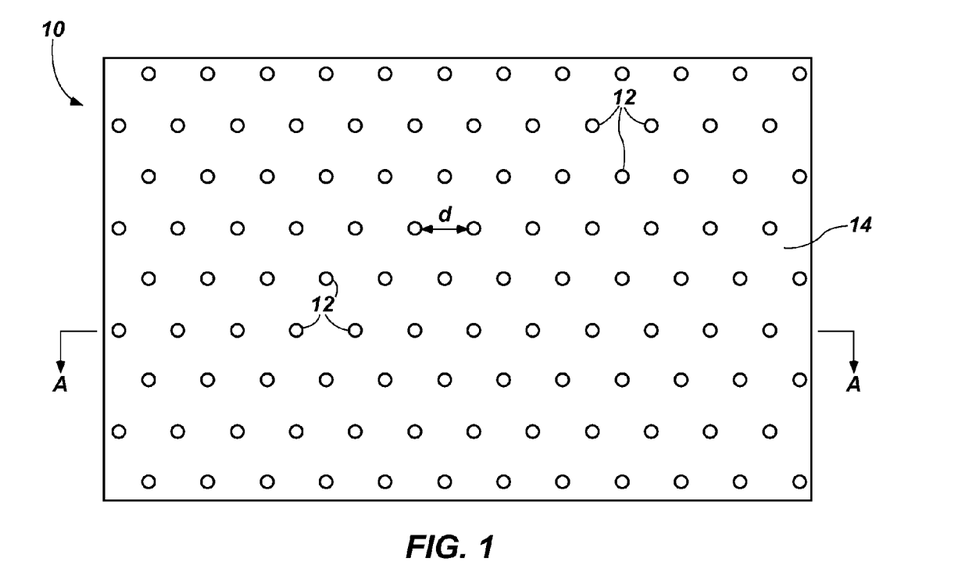
FIG. 1 is a schematic plan view of a porous material.

Referring to FIG. 1, a schematic plan view of a porous material 10 is shown. The porous material 10 includes a plurality of pores 12 in a matrix material 14. The plurality of pores 12 extends into the matrix material 14. The pores 12 may be generally disposed in an ordered array. The ordered array may comprise an at least substantially uniform nanoscale pattern. Irregularities may be present in the pattern formed by the plurality of pores 12 in some embodiments, such that the pattern formed by the plurality of pores 12 is generally uniform. In other embodiments, the plurality of pores 12 may form a uniform nanoscale pattern. By way of example, an average distance d between adjacent pores 12 of the plurality of pores 12 may be between about 50 nm and about 500 nm. More specifically, the average distance d between adjacent pores 12 may be between about 75 nm and about 250 nm. As a non-limiting example, the average distance d between adjacent pores 12 may be about 100 nm. The ordered array may comprise a generally hexagonal domain or pattern including pores 12 ordered in a repeated generally hexagonal shape. Stated another way, the ordered array may comprise a repeated generally hexagonal shaped unit cell defined by six pores 12 disposed at the six vertices of a hexagon. In some embodiments, a seventh pore 12 may be located centrally within the hexagon defined by the six pores 12 at the vertices (i.e., at least substantially equidistant from the six pores 12 defining the vertices of the hexagonal shape). The pores 12 may have a generally circular cross-sectional shape, and therefore may comprise generally cylindrical nanoscale voids extending into the matrix material 14.

The matrix material 14 may comprise a commercially pure metal in some embodiments. In other embodiments, the matrix material 14 may comprise a metal alloy. For example, the matrix material 14 may comprise commercially pure nickel or a nickel alloy. In still other embodiments, the matrix material 14 may comprise a particle-matrix composite. For example, the matrix material 14 may comprise a plurality of nanoparticles interspersed among a commercially pure metal or a metal alloy matrix (e.g., commercially pure nickel or a nickel alloy). The nanoparticles may comprise, for example, nanoparticles of allotropes of carbon (e.g., diamond, graphite, graphene, amorphous carbon, fullerenes, carbon nanotubes, and carbon nanobuds), polymer nanoparticles (e.g., nanoparticles of PTFE), ceramic nanoparticles (e.g., metal carbides, such as tungsten carbide), nanoparticles of superhard materials (e.g., cubic boron nitride, and carbon nitrides), and other nanoparticles known in the art. In one particular non-limiting embodiment, the metal alloy matrix may comprise a nickel-based alloy, and the nanoparticles may comprise graphene molecules.

Figure 2:
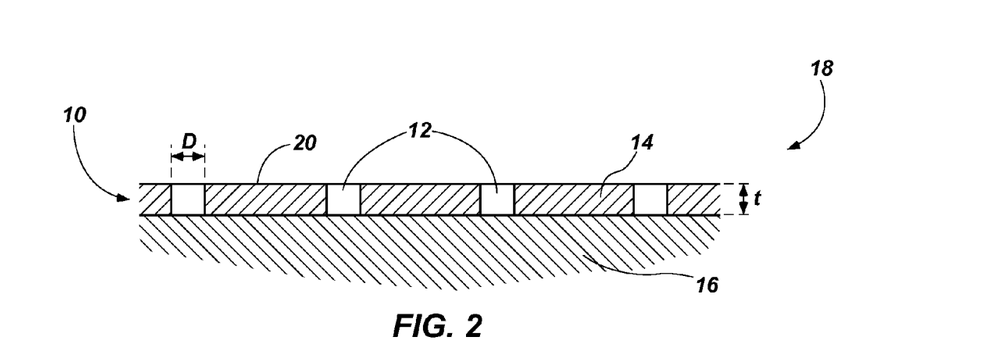
FIG. 2 depicts a schematic cross-sectional view of the porous material of FIG. 2.

FIG. 2 depicts a schematic cross-sectional view of the porous material 10 of FIG. 2 taken along line A-A. The porous material 10 may be disposed on (e.g., formed on, deposited on, or otherwise attached to) a body 16 in some embodiments. Thus, the porous material 10 may form a portion of an article of manufacture 18. In other embodiments, the porous material 10 may be free of (e.g., removed from) attachment to any other body or structure. The porous material 10 may comprise an at least substantially uniform layer of material disposed on the body 16. The at least substantially uniform layer may have an average thickness t. For example, the porous material 10 may comprise an at least substantially uniform layer having an average thickness t of up to about 5 µm, up to about 7 µm, or even up to about 10 µm. At least some pores 12 of the plurality of pores 12 may extend from an outer surface 20 of the porous material 10, through the porous material 10, to the body 16 in some embodiments. Thus, the pores 12 may extend entirely through the thickness t of the porous material 10 in such embodiments. Pores 12 of the plurality of pores 12 may have an at least substantially uniform diameter D. For example, pores 12 of the plurality of pores 12 may have a diameter D of less than about 20 nm. More specifically, pores 12 of the plurality of pores 12 may have a diameter –D of between about 7 nm and about 12 nm. Pores 12 of the plurality of pores 12 may have an average diameter D of about 10 nm, in one particular non-limiting embodiment.

The plurality of pores 12 of the porous material 10 may be free of other material in some embodiments. In other words, other materials may not be disposed in the pores 12 of the porous material 10. Thus, the pores 12 may comprise voids communicating with opposing sides of the porous material 10 through the entire thickness t of the porous material 10. Such embodiments may be useful after removal from the body 16, for example, as permeable membranes having nanoscale pores 12 through which only molecules and particles of sufficiently small size may pass. As a specific, nonlimiting example, such embodiments may be useful as filters through which nanoscale molecules and particles (e.g., nanoparticles) may pass, but larger objects and structures (e.g., microparticles and sub-micron sized particles) may not pass.

Figure 3:
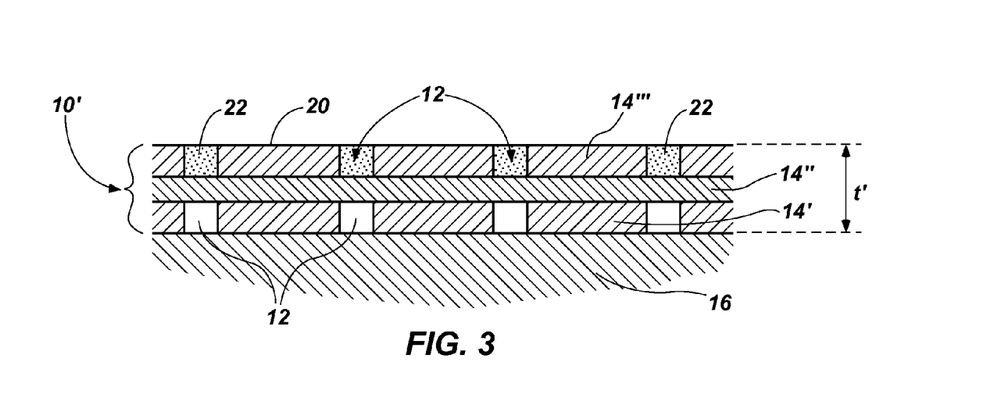
FIG. 3 illustrates a schematic cross-sectional view of another embodiment of a porous material.

Referring to FIG. 3, a schematic cross-sectional view of another embodiment of a porous material 10' is shown. At least some pores 12 of the plurality of pores 12 may extend from the outer surface 20 of the porous material 10' to a location within the porous material 10' in some embodiments. In such embodiments, the pores 12 may extend only partially through a thickness t' of the porous material 10'. In other words, the pores 12 may form voids within the porous material 10', but may not necessarily open to an outer surface of the porous material or provide communication through the entire thickness t' of the porous material 10'. For example, the porous material 10' may comprise alternating portions of matrix material 14 having a plurality of pores 12 and portions of matrix material 14 lacking pores 12. The alternating portions may comprise layers of the matrix material 14 that are alternately disposed on a body 16. As a specific, nonlimiting example, the porous material 10' may comprise a first layer of matrix material 14' including a plurality of pores 12 disposed on the body 16, a second layer of matrix material 14" lacking pores 12 disposed on the first layer of matrix material 14', and a third layer of matrix material 14''' including a plurality of pores 12 disposed on the second layer of matrix material 14". The alternating layers of matrix material 14 may have the same material composition in some embodiments. In other embodiments, the material compositions of adjacent layers of matrix material 14 may be different from one another.

An optional filler material 22 may be disposed in at least some pores 12 of the porous material 10' in some embodiments. The optional filler material 22 may completely fill the voids of the pores 12 in some embodiments. In other embodiments, the optional filler material 22 may partially fill the voids of the pores 12. The filler material 22 may comprise, for example, a dry lubricant (e.g., graphite, hexagonal boron nitride, molybdenum disulfide, or tungsten disulfide), a permanent magnet (e.g., ferromagnetic and ferrimagnetic materials), an electrical conductor (e.g., copper, gold, etc.), a semiconductor (e.g., silicon, gallium nitride, indium phosphide, etc.) a superhard material (e.g., diamond or cubic boron nitride), or any other material that may impart one or more desirable properties to the porous material. Thus, the optional filler material 22 may impart one or more desirable tribological properties (i.e., abrasion, friction, wear, etc.), hardness, magnetic, electrically conductive, thermally conductive, or other properties to the porous material 10'. Such embodiments may be useful, for example, as materials for sensors or as coatings on bodies 16 lacking such properties.

Figure 4:
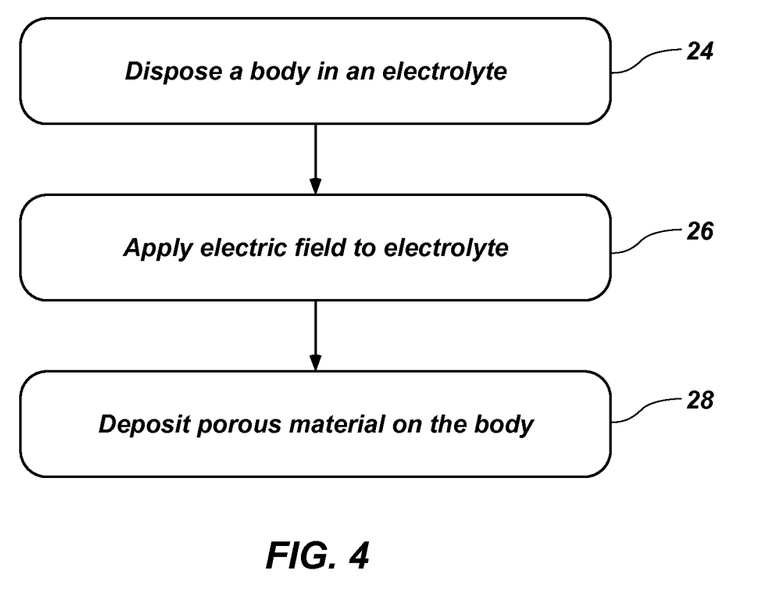
FIG. 4 is a flow chart showing acts for forming a porous material in situ on a body.

FIG. 4 is a flow chart showing acts for forming a porous material 10 in situ on a body 16. The porous material 10 may be formed in situ on the body 16 by, for example, electroplating the porous material 10 on the body 16. Applicants have unexpectedly discovered that certain electroplating processes, when carried out with particular operating parameters, may be used to deposit porous materials as described herein in situ on another body 16. The body 16 may comprise a cathode, or may be electrically coupled with a cathode in an electroplating apparatus (effectively rendering the body 16 part of the cathode). The body 16 may comprise a material on which commercially pure nickel, a nickel alloy, or a particle-matrix composite material comprising nickel may be electroplated. For example, the body 16 may comprise a metal or a metal alloy. As a specific, nonlimiting example, the body 16 may comprise one of a steel plate and a copper plate. As other examples, the body 16 may comprise an earth-boring tool, a portion of an earth-boring tool, a component of a pump, motor, or another apparatus or structure on which a porous material 10 may be provided.

As generally indicated at 24, the body 16 may be at least partially disposed in an electrolyte. The electrolyte may comprise a material suitable for plating commercially pure nickel, a nickel alloy, or a particle-matrix composite material comprising nickel on the body 16. For example, the electrolyte may comprise nickel ions and a dispersant. As a specific, nonlimiting example, the electrolyte may comprise nickel sulfamate and a polycarboxylate ether dispersant. More specifically, the electrolyte may comprise, for example, a solution comprising 300 g/L nickel sulfamate tetrahydrate, 20 g/L nickel chloride, 40 g/L boric acid, and between about 0.05 g/L and about 1.00 g/L MelPers 9560, a dispersant offered by BASF Corporation of Florham Park, N.J., and BASF SE of Ludwigshafen, Germany. Optional nanoparticles may be added to the electrolyte in some embodiments. For example, nanoparticles of allotropes of carbon (e.g., nanodiamonds, graphite nanoparticles, graphene nanoparticles, amorphous carbon nanoparticles, fullerenes, carbon nanotubes, and carbon nanobuds), polymer nanoparticles (e.g., nanoparticles of PTFE), ceramic nanoparticles (e.g., metal carbide nanoparticles, such as tungsten carbide nanoparticles), nanoparticles of superhard materials (e.g., cubic boron nitride nanoparticles, and carbon nitride nanoparticles), and other nanoparticles known in the art may optionally be added to the electrolyte. For example, graphene molecules may be added to the electrolyte in some embodiments. The electrolyte may be provided in a quantity sufficient to submerge at least a portion of the body 16 in the electrolyte. Thus, the body 16 may be entirely or only partially submersed in the electrolyte.

An anode may likewise be at least partially disposed in the electrolyte. The anode may comprise a material suitable for plating commercially pure nickel, a nickel alloy, or a particle-matrix composite material comprising nickel on the body 16. In some embodiments, the anode may be at least partially consumed during the electroplating process as ions of the material of the anode travel from the anode through the electrolyte and are deposited on the body 16. In other embodiments, a non-consumable anode (e.g., a lead anode) may be disposed in the electrolyte, and ions of the material to be deposited on the body 16 may be found solely in the electrolyte. As an example of a consumable anode, the anode may comprise nickel. As a specific, nonlimiting example, the anode may comprise commercially pure nickel. More specifically, the anode may comprise, for example, a plate of commercially pure nickel that has been prepared for use as an anode in an electroplating process. As a specific, nonlimiting example, the anode may comprise a nickel plate. About half of the anode may be submerged in the electrolyte in some embodiments. In other embodiments, greater than half or less than half of the anode may be submerged in the electrolyte. Thus, the anode may be partially disposed in the electrolyte in some embodiments. In other embodiments, the anode may be completely submerged in the electrolyte. The anode may be disposed in the electrolyte parallel to the body 16 in some embodiments. In other embodiments, the anode may extend at an oblique angle relative to the body 16 or may be perpendicular to the body 16. The anode may be located proximate the body 16 in some embodiments. For example, a separation distance (i.e., the shortest distance) between the anode and the body 16 may be between about 1 cm and 3 cm. More specifically, the separation distance may be about 2 cm. In other embodiments, the anode may be located distant from the body 16. For example, the anode may be located at a first end of a container in which the electrolyte is disposed and the body 16 may be located at a second, opposing end of the container. As yet another example, the anode may be located at a maximum distance from the body 16 that still enables plating of the porous material 10 on the body 16. As a specific, nonlimiting example, the body 16 and the anode may be disposed in the electrolyte to form a Hull cell.

The electrolyte may be agitated. For example, the electrolyte may be stirred before the anode and the body 16 are disposed in the electrolyte. Stirring of the electrolyte may continue throughout the process of depositing the porous material 10 on the body 16. As a specific, nonlimiting example, a member disposed in the electrolyte may rotate at 300 rpm to stir the electrolyte.

As indicated generally at 26, an electric field may be applied to the electrolyte. The electric field may cause ions of the matrix material 14 to be plated on the body 16, as indicated generally at 28. As the matrix material 14 is deposited on the body 16, the electric field used to induce plating of the matrix material 14 may naturally cause at least some of the matrix material 14 to deposit itself on the body 16 such that pores 12 extend into the matrix material 14, thus forming a porous material 10 in situ on the body 16. For example, the cathode and the anode may be connected to an electrical power source, and the electrical power source may cause an electric field to be applied to the electrolyte by producing an electrical signal to at least one of the anode and the cathode.

Figure 5:
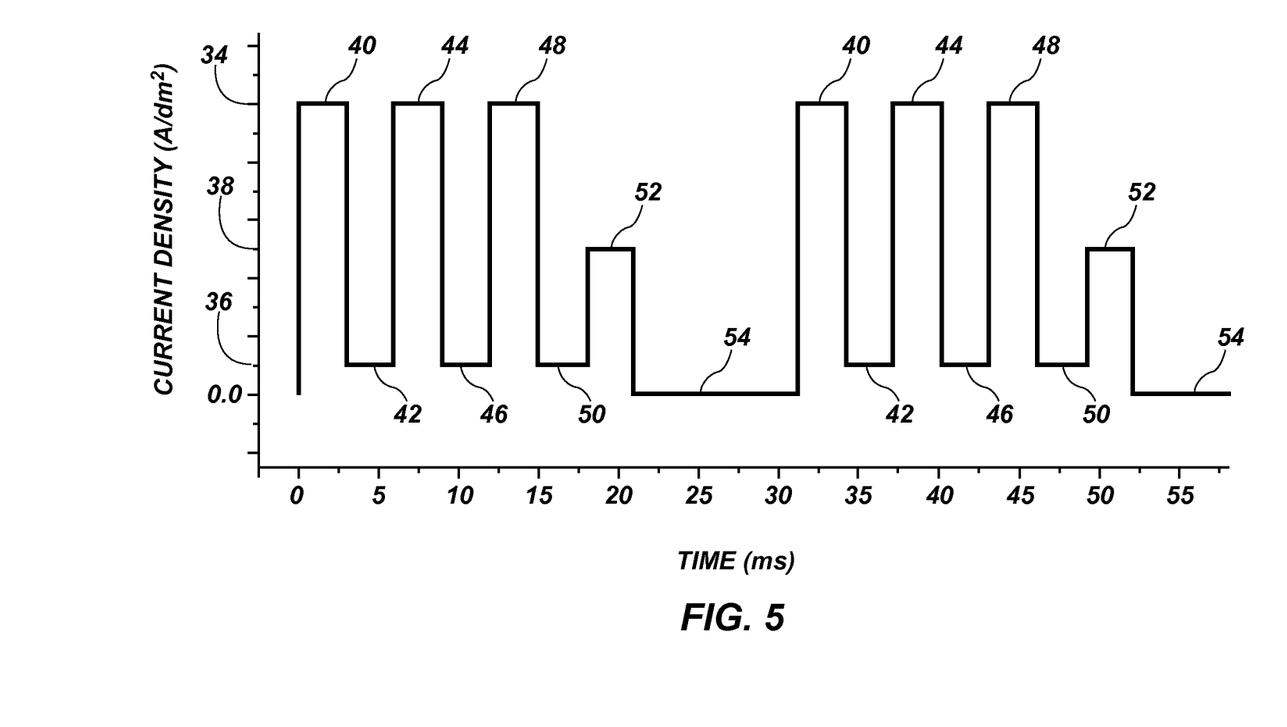
FIG. 5 depicts a pulsed electrical signal that may be used to form a porous material

The electrical power source may pulse the electrical signal. An electrical power source (e.g., a battery, generator, or power system) may alternate a current density amplitude of the pulsed electrical signal among a first current density 34, a second, lower current density 36, and a third, intermediate current density 38 in a square wave pattern, as shown in FIG. 5. The first current density 34 may be about 5.0 A/dm$^2$. For example, the first current density 34 may be between about 4.8 A/dm$^2$ and about 5.2 A/dm$^2$. The second, lower current density 36 may be greater than 0 A/dm$^2$. For example, the second, lower current density 36 may be between about 0.1 A/dm$^2$ and about 0.75 A/dm$^2$. More specifically, the second, lower current density 36 may be about 0.5 A/dm$^2$. The third, intermediate current density 38 may be about 2.5 A/dm$^2$. For example, the third, intermediate current density 38 may be between about 2.3 A/dm$^2$ and about 2.7 A/dm$^2$. The electrical power source may pulse the electrical signal at a frequency of about 0.33 kHz. In other words, the electrical signal may remain at a given current density (e.g., one of the first, second, lower, and third, intermediate current densities 34, 36, and 38) for about 3 ms. For example, the frequency at which the electrical signal is pulsed may be between about 0.28 kHz and 0.38 kHz.

The pulsed electrical signal may comprise a series of seven electrical pulses followed by a pause. For example, the electrical signal may comprise a first electrical pulse 40 at the first current density 34 lasting about 3 ms, a second electrical pulse 42 at the second, lower current density 36 lasting about 3 ms, a third electrical pulse 44 at the first current density 34 lasting about 3 ms, a fourth electrical pulse 46 at the second, lower current density 36 lasting about 3 ms, a fifth electrical pulse 48 at the first current density 34 lasting about 3 ms, a sixth electrical pulse 50 at the second, lower current density 36 lasting about 3 ms, and a seventh electrical pulse 52 at the third, intermediate current density 38 lasting about 3 ms. A pause 54 may follow each sequence of seven electrical pulses 40 through 52. During the pause 54, the current density may be 0.0 A/dm$^2$. The pause 54 may last for about 10 ms. For example, the pause 54 may last for between 9 ms and 11 ms. Following the pause 54, the sequence of seven electrical pulses 40 through 52 may be repeated, followed by another pause 54, and so on. Thus, the porous material 10 may be formed in situ on the body 16 by plating the matrix material 14 on the body 16 using a pulsed electrical signal.

In some embodiments, the electrical power source may alternate between pulsing the electrical signal in a way that produces the porous material 10 and either pulsing the electrical signal in a way that does not produce the porous material 10 or providing a steady (i.e., non-pulsed) electrical signal that does not produce the porous material 10, but rather deposits a substantially fully dense material without pores or a material having pores in a generally disordered (i.e., at least substantially randomly distributed) array. For example, the electrical power source may pulse the electrical signal in a way that produces the porous material 10, as described previously, for a predetermined amount of time (e.g., for about 10 minutes). The electrical power source may then pulse the electrical signal in a way that does not produce the porous material 10 or provide a steady (i.e., non-pulsed) electrical signal that does not produce the porous material 10 for another predetermined amount of time that may be the same as or different than the time during which the porous material 10 was produced. By so doing, alternating layers of porous material 10 and either non-porous material (e.g., layer of matrix material 14" shown in FIG. 3) or material having pores in a generally disordered array may be plated on the body 16.

Figure 6:
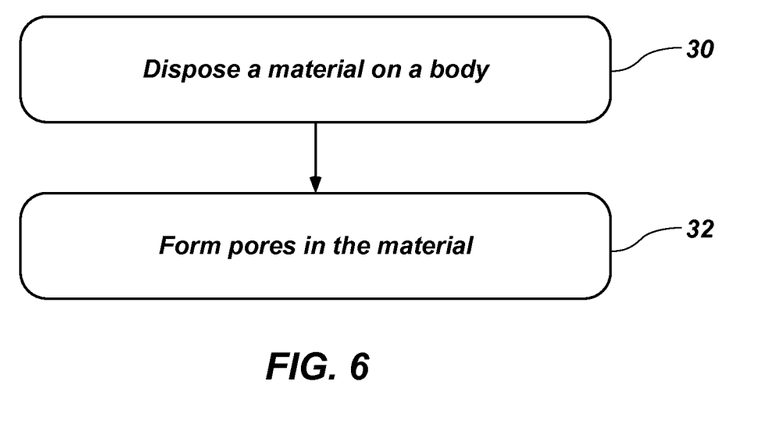
FIG. 6 depicts a flow chart showing acts for making a porous material.

FIG. 6 depicts a flow chart showing acts for making a porous material 10 having a configuration as previously described herein, but wherein the pores material 10 is not formed in situ with pores as described above with reverence to FIG. 4, but wherein a matrix material is first deposited and pores are subsequently formed therein. As indicated generally at 30, a matrix material 14 may optionally be disposed on a body 16 in some embodiments. In other embodiments, the matrix material 14 may be provided separately from the body 16. In embodiments where the matrix material 14 is disposed on the body 16, the matrix material 14 may be disposed on the body 16 by, for example, electroplating, adhering, welding, growing, sputtering, soldering, or otherwise providing the material on the body 16.

The material may comprise nickel. For example, the material may comprise commercially pure nickel, a nickel alloy, or a particle-matrix composite material comprising nickel. As a specific, nonlimiting example, the material may comprise a layer of commercially pure nickel, a nickel alloy, or a particle-matrix composite material comprising nickel having a thickness of up to about 5 µm, up to about 7 µm, or even up to about 10 µm.

As indicated generally at 32, pores 12 may be formed in the material to produce the porous material 10. For example, pores 12 may be drilled into the material 10. As a specific, nonlimiting example, the pores 12 may be drilled into the material 10 using a laser drill. The pores 12 may have a diameter D of less than about 20 nm and, more specifically, between about 7 nm and about 12 nm. The pores 12 may have an average diameter D of about 10 nm. The pores may be drilled entirely through a thickness t of the material in some embodiments. In other embodiments, the pores 12 may be drilled partially through the thickness t of the material. Thus, a porous material 10 may be made. A porous material 10 so formed may subsequently be attached to a body 16, such as, for example, using an adhesive, by welding, by brazing, or by other attachment or coating processes known in the art.

EXAMPLES

Figure 7A:
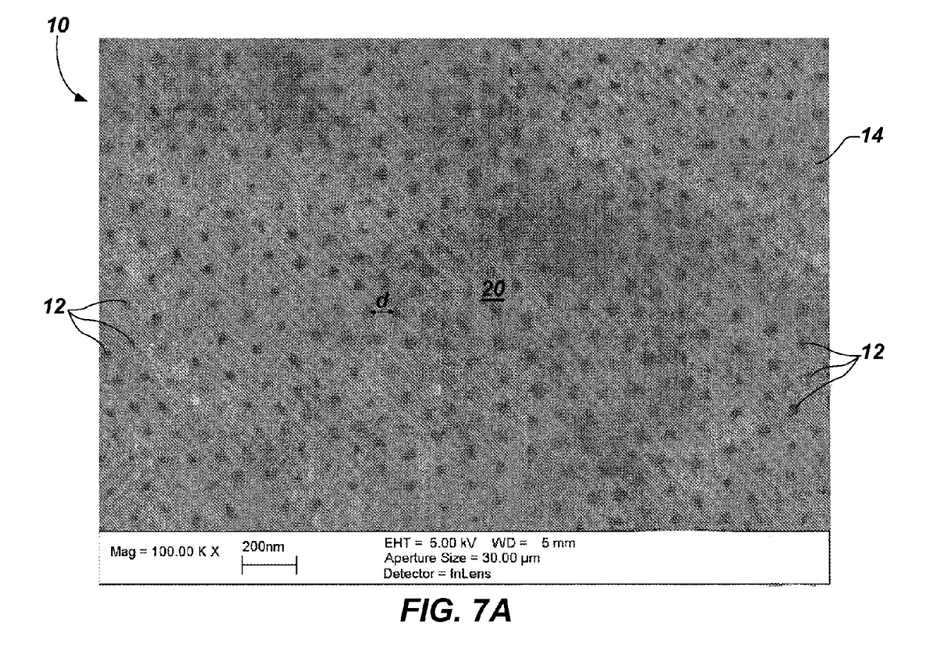
FIGS. 7A and 7B are photomicrographs of a porous material.
Figure 7B:
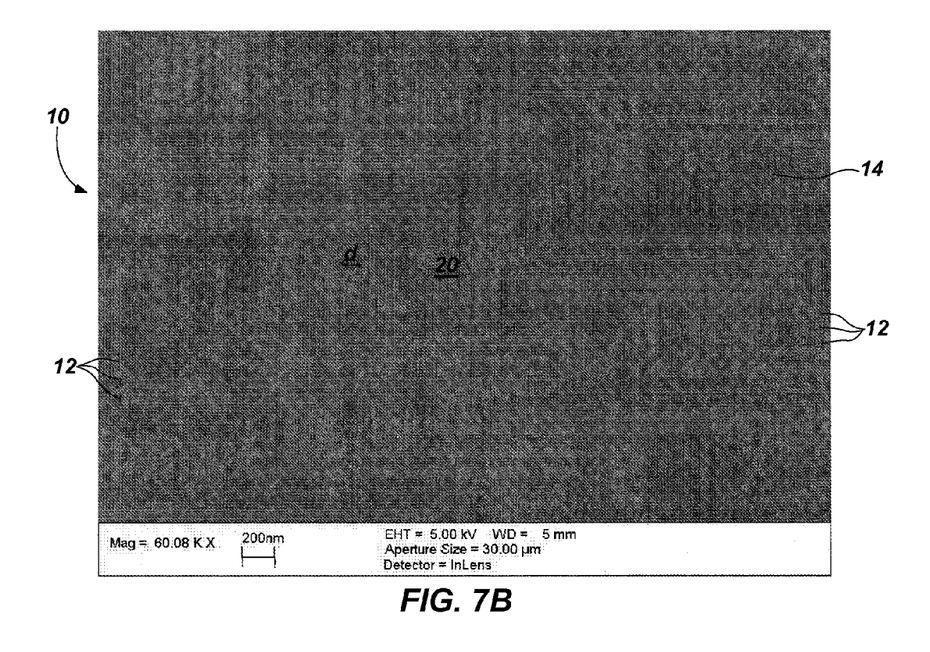

FIGS. 7A and 7B are photomicrographs of porous materials 10 formed in situ on a body 16 as described herein with reference to FIG. 4. The porous material 10, as formed in situ, comprised nickel having a plurality of pores 12 disposed in a generally ordered array extending into the nickel. The ordered array comprised a generally uniform nanoscale pattern of a generally hexagonal domain (unit cell) having pores 12 ordered in a repeated generally hexagonal shape.

The porous material 10 was formed in situ on the body 16 by electroplating the porous material 10 on the body 16. The body 16 comprised a plate of steel that was prepared for use as a cathode for an electroplating process. Specifically, a zinc plated steel plate was prepared for use as a cathode by placing the steel plate in hydrochloric acid for about 10 seconds to remove about 2 µm to 3 µm of zinc plating. The steel plate was then cleaned by wiping and rinsing with deionized water to prepare the steel plate for electroplating. The steel plate comprised a 100 mm by 20 mm rectangular shape having a thickness of 0.30 mm.

The body 16 was partially disposed in an electrolyte. The electrolyte comprised a solution comprising 300 g/L nickel sulfamate tetrahydrate, 20 g/L nickel chloride, 40 g/L boric acid, and 0.5 g/L Melpers 9560. Optional nanoparticles were added to the electrolyte in some examples. Specifically, graphene nanoparticles were added to the electrolyte in such examples. In other examples, however, optional nanoparticles were not added to the electrolyte. About 250 ml of the electrolyte was provided in a glass beaker at room temperature, and about half of the body 16 (i.e., about 50 mm by 20 mm of the rectangular shape having the thickness of 0.30 mm) was submerged in the electrolyte. A stirring member disposed in the glass beaker was rotated at 300 rpm to stir the electrolyte throughout the process.

An anode was likewise partially disposed in the electrolyte. The anode comprised a plate of commercially pure nickel that was prepared for use as an anode in an electroplating process by placing the nickel plate in hydrochloric acid for about 1 minute to remove any impurities or contaminants from the surfaces thereof. The nickel plate was then cleaned by wiping and rinsing with deionized water to prepare the nickel plate for electroplating. The anode comprised a nickel plate comprising a 200 mm by 50 mm rectangular shape having a thickness of 2 mm. Less than half of the anode (i.e., about 60 mm by 50 mm of the rectangular shape having the thickness of 2 mm) was submerged in the electrolyte. The anode was disposed in the electrolyte parallel to the body 16. Parallel surfaces of the anode and the body 16 were located about 2 cm from one another. The body 16 and the anode were disposed in the electrolyte to form a Hull cell.

An electric field was applied to the electrolyte, causing ions of the matrix material 14 to be plated on the body 16. As the matrix material 14 was deposited on the body 16, the electric field used to induce plating of the matrix material 14 naturally caused the matrix material 14 to deposit itself (i.e., by plating) on the body 16 such that pores 12 extended into the matrix material 14, thus forming a porous material 10 in situ on the body 16. Specifically, the cathode and the anode were connected to an electrical power source, and the electrical power source caused an electric field to be applied to the electrolyte.

The electrical power source produced a pulsed electrical signal. An electrical power source (i.e., a battery) alternated a current density amplitude of the pulsed electrical signal among a first current density 34, a second, lower current density 36, and a third, intermediate current density 38. The first current density 34 was 5.0 A/dm$^2$, the second, lower current density 36 was 0.5 A/dm$^2$, and the third, intermediate current density 38 was 2.5 A/dm$^2$. The electrical power source pulsed the electrical signal at a frequency of 0.33 kHz. The pulsed electrical signal comprised a series of seven electrical pulses followed by a pause. Specifically, the electrical signal comprised a first electrical pulse 40 at the first current density 34 lasting 3 ms, a second electrical pulse 42 at the second, lower current density 36 lasting 3 ms, a third electrical pulse 44 at the first current density 34 lasting 3 ms, a fourth electrical pulse 46 at the second, lower current density 36 lasting 3 ms, a fifth electrical pulse 48 at the first current density 34 lasting 3 ms, a sixth electrical pulse 50 at the second, lower current density 36 lasting 3 ms, and a seventh electrical pulse 52 at the third, intermediate current density 38 lasting 3 ms. A pause 54 followed each sequence of seven electrical pulses 40 through 52. During the pause 54, the current density was 0.0 A/dm². Each pause 54 lasted for 10 ms. Following the pause 54, the sequence of seven electrical pulses 40 through 52 was repeated, followed by another pause 54, and so on. Thus, the porous material 10 was formed in situ on the body 16 by plating the matrix material 14 on the body 16 using a pulsed electrical signal.

While the present invention has been described herein with respect to certain exemplary embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

CONCLUSION

In some embodiments, articles of manufacture comprise a body. A porous material is plated on the body, the porous material comprising nickel having a plurality of pores generally disposed in an ordered array extending into the nickel.

In other embodiments, methods of forming a porous material on a body comprise disposing an anode and a cathode in an electrolyte comprising nickel ions. An electrical signal is pulsed to at least one of the anode and the cathode. A porous material comprising nickel having a plurality of pores generally disposed in an ordered array extending into the nickel is deposited on the cathode.

What is claimed is:

1. An article of manufacture, comprising:
    a body; and
    a porous material plated on the body, the porous material comprising:
        a first region of nickel having a plurality of pores disposed in a generally ordered array extending into the nickel of the first region, an average distance between adjacent pores of the plurality of pores of the first region being between about 75 nm and about 250 nm;
        a second region of nickel lacking pores, the second region being disposed adjacent to the first region; and
        a third region of nickel disposed adjacent to the second region on a side of the second region opposing the first region, the third region having a plurality of pores disposed in a generally ordered array extending into the nickel of the third region, an average distance between adjacent pores of the plurality of pores of the third region being between about 75 nm and about 250 nm.

2. The article of manufacture of claim 1, wherein the ordered array of the first region comprises an at least substantially uniform nanoscale pattern.

3. The article of manufacture of claim 1, wherein the average distance between adjacent pores of the plurality of pores of the first region is about 100 nm.

4. The article of manufacture of claim 1, wherein the ordered array of the first region comprises a generally hexagonal domain comprising pores ordered in a repeated generally hexagonal shape.

5. The article of manufacture of claim 1, wherein at least some pores of the plurality of pores of the first region comprise an at least substantially circular cross-section.

6. The article of manufacture of claim 5, wherein at least some pores of the plurality of pores of the first region comprise a diameter of about 10 nm.

7. The article of manufacture of claim 1, wherein at least some pores of the plurality of pores of the third region extend from an outer surface of the porous material to the second region within the porous material.

8. The article of manufacture of claim 1, wherein the first region of the porous material comprises an at least substantially uniform layer having a thickness of about 10 μm or less.

9. The article of manufacture of claim 1, further comprising nanoparticles of at least one of an allotrope of carbon, PTFE, a metal carbide, cubic boron nitride, and a carbon nitride interspersed among a matrix of the nickel of the first region, the second region, and the third region.

10. The article of manufacture of claim 1, further comprising at least one of a dry lubricant, a permanent magnet, an electrical conductor, a semiconductor, and a superhard material disposed in at least some pores of the plurality of pores of the third region.

11. A method of forming a porous material on a body, comprising:
    disposing an anode and a cathode in an electrolyte comprising nickel ions;
    pulsing a first electrical signal to at least one of the anode and the cathode;
    depositing a first region of a porous material on the cathode, the first region comprising nickel having a plurality of pores disposed in a generally ordered array extending into the nickel of the first region, an average distance between adjacent pores of the plurality of pores of the first region being between about 75 nm and about 250 nm;
    sending a second electrical signal to at least one of the anode and the cathode after depositing the first region, the second electrical signal being different from the first electrical signal;
    depositing a second region of the porous material adjacent to the first region, the second region comprising nickel lacking pores;
    pulsing the first signal to at least one of the anode and the cathode after depositing the second region; and
    depositing a third region of the porous material adjacent to the second region on a side of the second region opposing the first region, the third region comprising nickel having a plurality of pores disposed in a generally ordered array extending into the nickel of the third region, an average distance between adjacent pores of the plurality of pores of the third region being between about 75 nm and about 250 nm.

12. The method of claim 11, wherein disposing the anode and the cathode in the electrolyte comprising nickel comprises disposing the anode and the cathode in a sulfamate nickel electrolyte.

13. The method of claim 11, wherein pulsing the first electrical signal to the at least one of the anode and the cathode comprises pulsing an electrical signal in a square pulse pattern.

14. The method of claim 13, wherein pulsing the electrical signal in the square pulse pattern comprises pulsing the electrical signal between a first current density, a second, lower current density, the second, lower current density being greater than 0 A/dm², and a third, intermediate current density.

15. The method of claim 14, wherein pulsing the electrical signal in the square pulse pattern comprises pulsing a first electrical pulse at the first current density for about 3 ms, pulsing a second electrical pulse at the second, lower current density for about 3 ms, pulsing a third electrical pulse at the first current density for about 3 ms, pulsing a fourth electrical pulse at the second, lower current density for about 3 ms, pulsing a fifth electrical pulse at the first current density for about 3 ms, pulsing a sixth electrical pulse at the second, lower current density for about 3 ms, pulsing a seventh electrical pulse at the third, intermediate current density for about 3 ms, pausing at 0.0 A/dm$^2$ for about 10 ms, and repeating the foregoing sequence.

16. The method of claim 11, wherein depositing the first region of the porous material comprises depositing an at least substantially uniform layer of porous material having a thickness of about 10 μm.

17. The method of claim 11, wherein depositing the first region of the porous material having the plurality of pores, the average distance between adjacent pores of the plurality of pores of the first region being between about 75 nm and about 250 nm, comprises depositing the first region of the porous material having the plurality of pores, the average distance between pores of the plurality of pores of the first region being about 100 nm.

18. The method of claim 11, further comprising disposing a plurality of nanoparticles of at least one of an allotrope of carbon, PTFE, a metal carbide, cubic boron nitride, and a carbon nitride in the electrolyte and depositing the plurality of nanoparticles among a matrix of the nickel of the first region, the second region, and the third region.

19. The method of claim 11, further comprising disposing at least one of a dry lubricant, a permanent magnet, an electrical conductor, a semiconductor, and a superhard material in at least some pores of the plurality of pores of the third region.

* * * * *